United States Patent
Takeda et al.

(10) Patent No.: US 11,838,941 B2
(45) Date of Patent: Dec. 5, 2023

(54) TERMINAL, RADIO COMMUNICATION METHOD, AND BASE STATION FOR SCHEDULING PHYSICAL UPLINK SHARED CHANNEL (PUSCH)

(71) Applicant: NTT DOCOMO, INC., Tokyo (JP)

(72) Inventors: Kazuki Takeda, Tokyo (JP); Satoshi Nagata, Tokyo (JP); Qun Zhao, Beijing (CN); Xiaohang Chen, Beijing (CN); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 444 days.

(21) Appl. No.: 17/208,026

(22) Filed: Mar. 22, 2021

(65) Prior Publication Data

US 2021/0227557 A1    Jul. 22, 2021

Related U.S. Application Data

(63) Continuation of application No. 16/482,855, filed as application No. PCT/JP2018/003549 on Feb. 2, 2018, now abandoned.

(30) Foreign Application Priority Data

Feb. 2, 2017   (JP) ................. 2017-017976

(51) Int. Cl.
*H04W 4/00* (2018.01)
*H04W 72/566* (2023.01)
(Continued)

(52) U.S. Cl.
CPC ..... *H04W 72/569* (2023.01); *H04W 72/1268* (2013.01); *H04W 72/23* (2023.01)

(58) Field of Classification Search
CPC ............... H04W 72/569; H04W 72/23; H04W 72/1268
(Continued)

(56) References Cited

U.S. PATENT DOCUMENTS

2012/0120868 A1* 5/2012 Park ..................... H04B 7/2606
370/315
2012/0163335 A1   6/2012 Chung et al.
(Continued)

FOREIGN PATENT DOCUMENTS

WO   2015/179134 A1   11/2015
WO   2018/052060 A1   3/2018

OTHER PUBLICATIONS

Office Action issued in Chinese Application No. 201880019095.8 dated Aug. 30, 2022 (17 pages).
(Continued)

*Primary Examiner* — Mark G. Pannell
(74) *Attorney, Agent, or Firm* — Osha Bergman Watanabe & Burton LLP

(57) ABSTRACT

A terminal is disclosed that includes a receiver that receives a first downlink control information for scheduling a physical uplink shared channel (PUSCH) transmission, and a second downlink control information for notifying a time region and a frequency region in which the PUSCH is not to be transmitted. The terminal further includes a processor that supports reception of the second downlink control information in a slot that is shorter than a slot for transmitting the PUSCH. In other aspects, a radio communication method and a base station are also disclosed.

9 Claims, 9 Drawing Sheets

(51) Int. Cl.
*H04W 72/1268* (2023.01)
*H04W 72/23* (2023.01)

(58) Field of Classification Search
USPC .......................................................... 370/330
See application file for complete search history.

(56) References Cited

U.S. PATENT DOCUMENTS

| | | |
|---|---|---|
| 2015/0333898 A1 | 11/2015 | Ji et al. |
| 2016/0295584 A1 | 10/2016 | Chen et al. |
| 2017/0367046 A1* | 12/2017 | Papasakellariou ........................... H04W 72/0446 |
| 2018/0192434 A1* | 7/2018 | Lee ....................... H04W 28/12 |
| 2018/0270800 A1* | 9/2018 | Park ....................... H04W 72/23 |
| 2018/0310333 A1* | 10/2018 | Akkarakaran ........ H04W 72/20 |
| 2018/0368169 A1* | 12/2018 | Jung ........................ H04L 41/08 |
| 2019/0053206 A1* | 2/2019 | Babaei .................. H04W 72/23 |
| 2020/0228230 A1* | 7/2020 | Mukherjee ............ H04L 5/0055 |

OTHER PUBLICATIONS

International Search Report issued in PCT/JP2018/003549 dated Apr. 24, 2018 (2 pages).

Written Opinion of the International Searching Authority issued in PCT/JP2018/003549 dated Apr. 24, 2018 (6 pages).

Lenovo; "Overview on URLLC design and the coexistence with eMBB"; 3GPP TSG RAN WG1 NR Ad-Hoc Meeting, R1-1700554; Spokane, US; Jan. 16-20, 2017 (10 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).

* cited by examiner ically, $ | z | $

TERMINAL, RADIO COMMUNICATION METHOD, AND BASE STATION FOR SCHEDULING PHYSICAL UPLINK SHARED CHANNEL (PUSCH)

CROSS-REFERENCE TO RELATED APPLICATIONS

This application is a continuation application of U.S. patent application Ser. No. 16/482,855, filed on Aug. 1, 2019, which is a national phase application of PCT/JP2018/003549, filed on Feb. 2, 2018, which claims priority to Japanese Patent Application No. 2017-017976, filed on Feb. 2, 2017. The contents of these applications are hereby incorporated by reference in their entirety.

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate multiple carriers (component carriers (CCs), cells, etc.) is introduced in order to achieve broadbandization. Each carrier is configured with the system bandwidth of LTE Rel. 8 as one unit. In addition, in CA, multiple CCs under the same radio base station (eNB: eNodeB) are configured in a user terminal (UE: User Equipment).

Meanwhile, in existing LTE systems (for example, LTE Rel. 12 and later versions), dual connectivity (DC), in which multiple cell groups (CGs) formed by different radio base stations are configured in a user terminal, is also introduced. Each cell group is comprised of at least one cell (CC, cell, etc.). In DC, since multiple CCs of different radio base stations are integrated, DC is also referred to as "inter-eNB CA."

In existing LTE systems (for example, LTE Rels. 8 to 13), downlink (DL) and/or uplink (UL) communication are carried out using 1-ms transmission time intervals (TTIs). This 1-ms TTI is the unit of time to transmit one channel-encoded data packet, and is the processing unit in scheduling, link adaptation and so on. A TTI of 1 ms is also referred to as a "subframe," a "subframe duration" and/or the like.

CITATION LIST

Non-Patent Literature

Non-Patent Literature 1: 3GPP TS36.300 V 8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) presume use cases characterized by, for example, high speed and large capacity (for example, eMBB (enhanced Mobile Broad Band)), a very large number of terminals (for example, massive MTC (Machine Type Communication)), ultra-high reliability and low latency (for example, ultra reliable and low-latency communications), and so on. For example, URLLC requires better latency reduction than in eMBB and/or higher reliability than in eMBB.

Thus, given that there is a possibility that a plurality of services having different requirements for latency reduction and/or reliability will be co-present in future radio communication systems, research is progress to support multiple TTIs of different time durations (for example, a TTI having a relatively long time duration (hereinafter referred to as a "long TTI," which is, for example, a TTI for eMBB), a TTI having a relatively short time duration (hereinafter referred to as a "short TTI," which is, for example, a TTI for URLLC), and so on). Alternatively, research is in progress to use a predetermined period (for example, a subframe of 1 ms) as the unit of processing in communication control, and to control the transmission and receipt of signals and/or others by applying, depending on communication services, shortened processing time, where the reference values for signal transmitting/receiving timings are configured shorter.

In addition, when communication services with different requirements are supported, it may occur that transmission and receipt for a predetermined communication service are prioritized (data interrupts are permitted) so as to meet the demand of this predetermined communication service (for example, latency reduction, high reliability and/or others). For example, after data is scheduled for a given communication service, before or while the transmission and/or receipt of this data is started, data that is directed to another communication service may be allowed to make an interrupt. In this case, transmitting the data for both communication services on an as-is basis may lead to a collision, and thereupon the quality of communication might deteriorate.

The present invention has been made in view of the above, and it is therefore an object of the present invention to provide a user terminal and a radio communication method, whereby, even when it is allowed to make interrupts with data in a radio communication system, the deterioration of communication quality can be reduced.

Solution to Problem

According to one aspect of the present invention, a user terminal has a receiving section that receives a UL transmission command (indication), and a control section that controls transmission of UL data, after a predetermined timing, in response to the UL transmission command, and, when information that indicates puncturing of at least part of the UL data is received, the control section applies puncturing to the UL data.

Advantageous Effects of Invention

According to the present invention, even when it is allowed to make interrupts with data in a radio communication system, the deterioration of communication quality can be reduced.

DESCRIPTION OF EMBODIMENTS

Figure 1A:
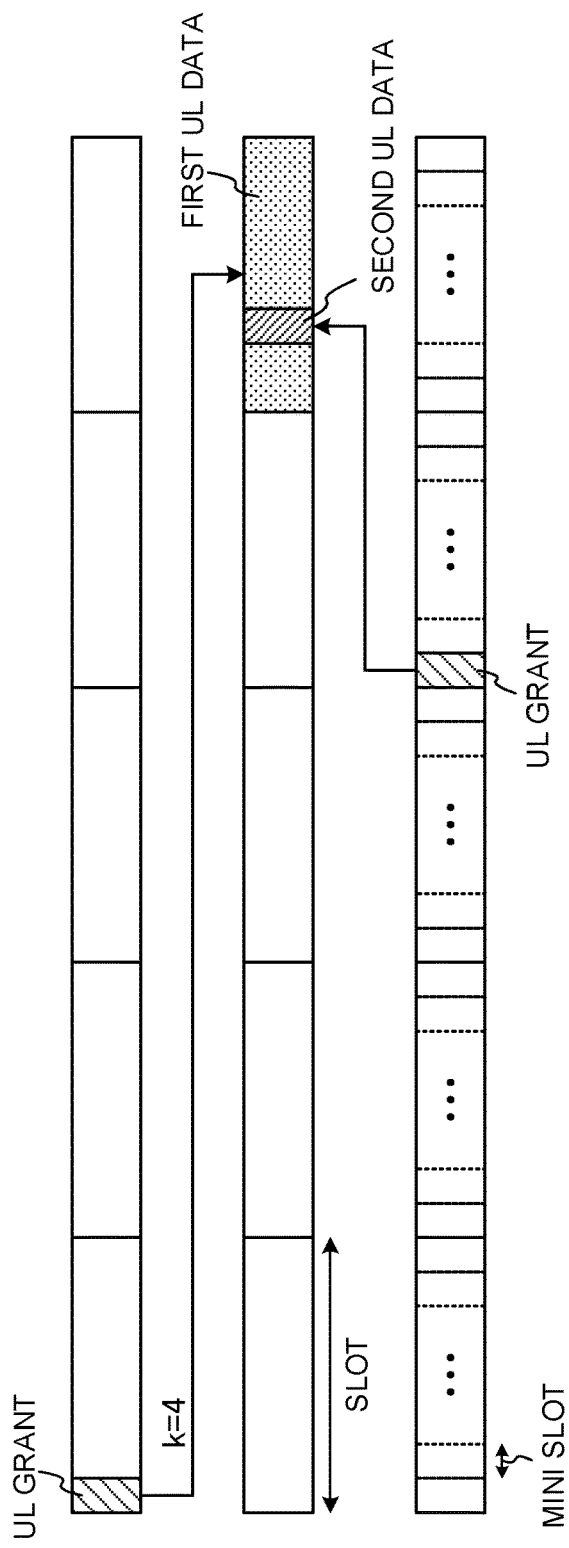
FIGS. 1A and 1B are diagrams to show examples of interrupting data.

In future radio communication systems (for example, 5G, NR, etc.), there is a possibility that services that require high speeds and large capacity (for example, eMBB) and services that require ultra-high reliability and low latency (for example, URLLCC) will be supported.

For services like URLLC that require ultra-high reliability and low latency, short TTIs, which are TTIs having a relatively short time duration, are suitable. This is so because short TTIs support high reliability (that is, retransmission in a short time) by providing short end-to-end latency (for example, frame fragmentation latency, transmission (Tx) latency, and so on) and/or short round-trip time.

On the other hand, for services like eMBB that require high-speeds and large capacity, long TTIs, which are TTIs having a relatively long time duration, are suitable. This is so because there is little control signal-induced overhead in long TTIs.

For future radio communication systems, a study is in progress to support long TTIs and short TTIs of varying time durations at the same time (in the same carrier (cell, component carrier (CC), etc.). A long TTI may be constituted, for example, by fourteen symbols, at a subcarrier spacing of 15 kHz, using a normal cyclic prefix (NCP). A long TTI may be referred to as a "normal TTI," a "subframe," and so on.

Also, a short TTI may be formed with a smaller number of symbols than a long TTI, at the same subcarrier spacing as the long TTI (for example, one or two symbols at a subcarrier spacing of 15 kHz, using NCP). Alternatively, a short TTI may be formed with the same or a different number of symbols than a long TTI, at a higher (wider) subcarrier spacing as than the long TTI (for example, fourteen symbols at a subcarrier spacing of 60 kHz, using NCP). Alternatively, a short TTI may be realized by combining both of these.

Alternatively, in a predetermined communication service (for example, URLLC), the signal transmitting/receiving timings may be shortened (shortened processing time may be applied) compared to other communication services (for example, eMBB). Examples of transmitting/receiving timings include, for example, the period from receipt of a UL transmission command (indication) (UL grant) to UL transmission, the period from receipt of DL data/UL data to feedback of a delivery acknowledgment signal (HARQ-ACK), and/or others.

In this way, when communication services with different requirements are supported, it may occur that transmission and receipt for a predetermined communication service are prioritized so as to meet the demand of this predetermined communication service (for example, latency reduction, high reliability and/or others). For example, after data is scheduled for a given communication service (for example, eMBB), before or while the transmission and/or receipt of this data is started, data that is directed to another communication service (for example, URLLC) may be allowed to interrupt the then-scheduled resources.

To be more specific, assuming that a long TTI and a short TTI are supported, even after scheduling is made in the long TTI, scheduling to use the same resources as the long TTI may be allowed in the short TTI, so as to meet the demand for delay reduction and/or reliability.

For example, assume a case where, using a long TTI, UL data transmission at a predetermined timing (for example, in slot #n) is scheduled in the user terminal. In this case, the radio base station transmits a UL grant for the first UL data to be transmitted in slot #n, to the user terminal, at a timing a predetermined period before (for example, in slot #n−k). Meanwhile, after slot #n-k, second UL data to use at least part of slot #n may arise in a communication service in which short TTIs are used. In this case, the radio base station schedules the second UL data to interrupt the resource for the first UL data (see FIG. 1A).

Alternatively, when shortened processing time is applied to a predetermined communication service, this communication service to use shortened processing time may be allowed to be scheduled after a communication service that uses normal processing time is scheduled.

For example, assume a case where, in a communication service to which the normal processing time (or a relatively long processing time) applies, UL data transmission at a predetermined timing (for example, in slot #n) is scheduled for the user terminal. In this case, the radio base station transmits a UL grant to command the first UL data transmission in slot #n to the user terminal at a timing a predetermined period earlier (for example, in slot #n−k). Meanwhile, after slot #n−k, second UL data that uses at least part of slot #n may arise in a communication service where shortened processing time applies. In this case, the radio base station schedules the second UL data to interrupt the resources for the first UL data (see FIG. 1B).

In this manner, by allowing data to make interrupts, it is possible to control scheduling flexibly, without worrying about the resource allocation (such as scheduled resources) for other communication services, in communication services that require low latency. Note that, in FIGS. 1A and 1B, the first UL data and the second UL data may be scheduled in the same user terminal or may be scheduled in different user terminals.

Figure 1B:
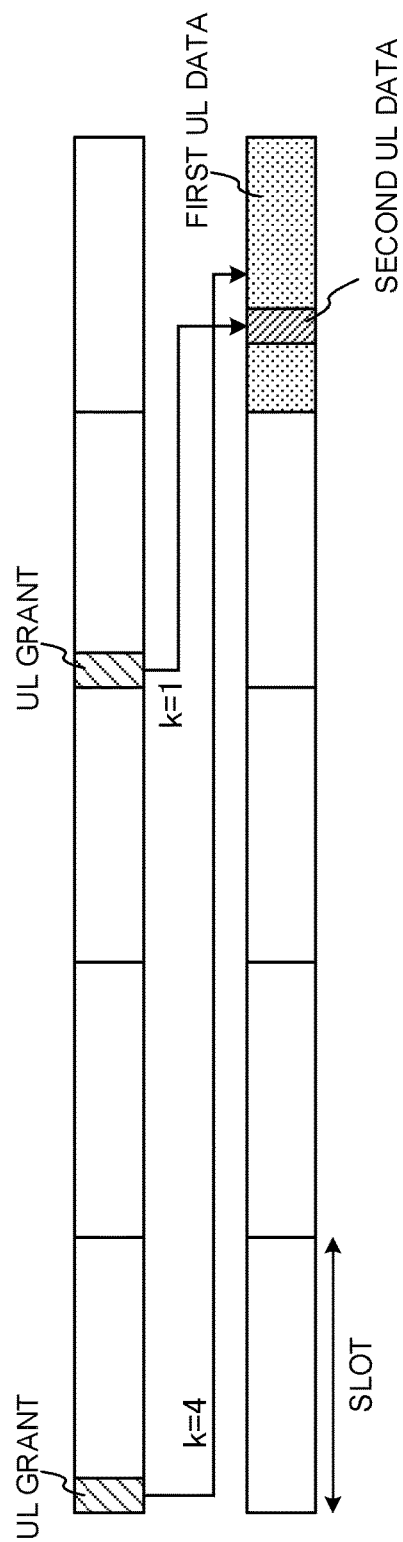

Also, although, in FIGS. 1A and 1B, both the first UL data and the second UL data are illustrated to be scheduled dynamically based on a UL grant and then transmitted, UL grant-free transmission, in which transmission is performed without referring to UL grants, may be applied to the first UL data and/or the second UL data.

In this case, resources that are available for transmission and transmission configuration information (transmission power, RS configuration, modulation scheme, TBS, etc.) are configured in the user terminal by higher layer signaling, and, if there is data to transmit, the user terminal transmits the UL data in the resources that are available for transmission, based on the configuration information.

Meanwhile, when it is allowed to make interrupts with data, transmitting the UL data for both communication services on an as-is basis may lead to a collision, and thereupon the quality of communication might deteriorate.

So, assuming that data (for example, UL data) is allowed to make an interrupt, the present inventors have come up with the idea of preventing the UL data from having a collision by reporting information that commands a user terminal to puncture at least part of the UL data, to the user terminal, and making the user terminal perform the puncturing process.

Also, the present inventors have focused on the point that the period after information that indicates puncturing is received, until the puncturing process is performed can be short compared to the period that is required (processing period) from when the user terminal receives a UL grant until when the user terminal transmits UL data, and come up with the idea of receiving the information that indicates puncturing after a UL transmission command is received (after slot #n−k, for example), and until a predetermined period before the UL data transmission (by slot #n−m, for example).

Also, the present inventors have come up with the idea of configuring user capability information that relates to the timing to transmit UL data (for example, the value of k) and user capability information that relates to the timing to receive information that indicates puncturing (for example, the value of m), separately, and reporting these from the user terminal to the radio base station.

Now, embodiments of the present invention will be described below in detail with reference to the accompanying drawings. The user terminal according to the present embodiment may be a user terminal to support both long TTIs (or normal processing time) and short TTIs (or shortened processing time), or may be a user terminal to support only one of them. Also, although the following description will illustrate an example case in which UL data is transmitted based on UL grants, the present embodiment is not limited to this. The present embodiment can also be applied to configurations for transmitting UL data without UL grants (UL grant-free transmission).

Figure 2:
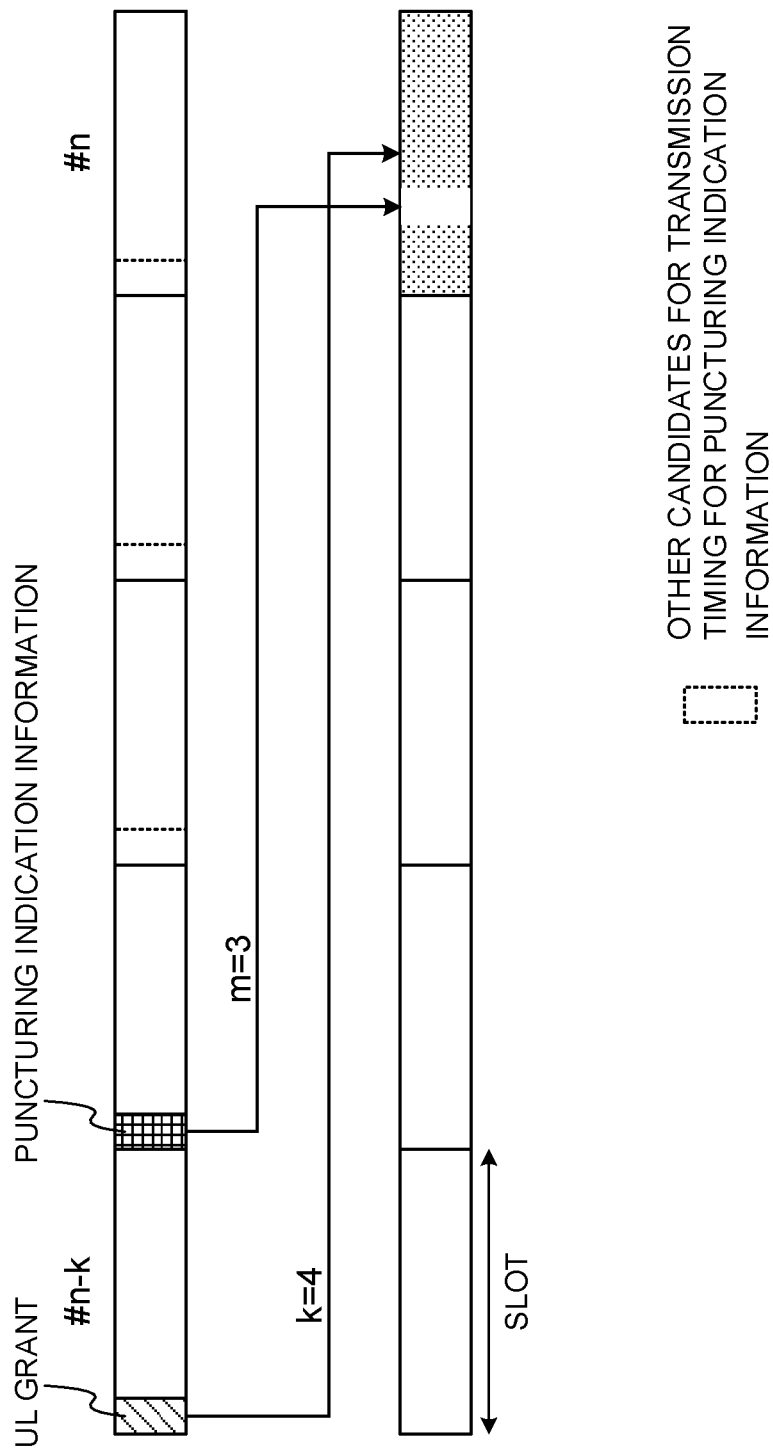
FIG. 2 is a diagram to show an example of the transmission method for use when there is interrupting data, according to the present embodiment.

FIG. 2 shows a case where the user terminal performs a puncturing process based on information that indicates puncturing ("puncturing indication information"). Note that the puncturing indication information has only to be information that reports part or all of UL data that is scheduled is not transmitted (transmission is limited).

FIG. 2 shows a case where, based on a UL grant that is transmitted in a predetermined time interval (here, in slot #n−k), the user terminal transmits UL data a predetermined time later (here, in slot #n). Also, in the case illustrated here, the user terminal receives puncturing indication information at a timing that is a predetermined period before slot #n, in which UL data is transmitted (here, in slot n−m). FIG. 2 shows a case where k=4 and m=3, but this is by no means limiting.

Also, the user terminal may receive the puncturing indication information during the period from the time the user terminal receives a UL transmission command, up to when the user terminal transmits UL data or a predetermined period before the timing the user terminal performs the puncturing process.

The timing from receipt of a UL grant to transmission of UL data (the value of k) may be specified in advance in the specification and/or the like on a fixed basis, may be configured dynamically by means of control information, or may be configured semi-statically by means of higher layer signaling (for example, RRC signaling, broadcast information, etc.). The value of k can be configured depending on the capabilities of each user terminal (for example, processing capabilities, supporting communication services, etc.).

The value of k can be, for example, one of 0 to 4. When k=0, the user terminal transmits the UL data in the slot in which the UL grant was received (self-contained). Also, the user terminal may report a value of k, which the user terminal supports, to the radio base station, as user capability information (first UE capability information). The radio base station configures the value of k to apply, based on the information reported from the user terminal. The configured value of k may be reported from the radio base station to the user terminal via higher layer signaling and/or the like. Alternatively, the configured value of k may be included in downlink control information for scheduling UL data. When included in down link control information, the value of k can be changed dynamically.

The timing for receiving the puncturing indication information (the value of m) that the user terminal can support can be configured depending on the capabilities of each user terminal (for example, puncturing processing capabilities, and so on). Normally, the puncturing process is not as complicated as the process of preparing UL data, a value less than or equal to k can be used here. Therefore, the user terminal may configure a value of m that the user terminal can support (for example, the minimum value), apart from the value of k (first UE capability information), and report this to the radio base station as another piece of user capability information (second UE capability information).

The radio base station configures the value of k and/or the value of m based on the capability information reported from the user terminal (first UE capability information and/or second UE capability information), controls the scheduling of UL data using UL grants, and controls the transmission timing of puncturing indication information. The transmission timing of puncturing indication information can be determined by taking into account the timing data is scheduled (interrupting transmission arises) for another communication service, and the value of m (receiving timing that the user can support) reported from the user terminal. For example, even when the value of m reported from the user terminal is 1, if the timing interrupting data is generated is an earlier timing than slot #n−m (for example, #n−3), the radio base station may transmit puncturing indication information at this timing to precede #n−m.

The puncturing indication information may indicate that part or all of the time fields of the scheduled UL data be punctured, or indicate that, in addition to the time fields (or instead of the time fields), part or all of the frequency fields of the UL data be punctured. The time fields may be symbols. The frequency fields may be resource blocks and/or resource block groups (PRBs).

The radio base station can report the puncturing indication information to the user terminal using a downlink control channel and/or another DL channel. When the puncturing indication information is reported in a downlink control channel (downlink control information), the puncturing indication information can be transmitted at the beginning of the slot. Although FIG. 2 shows a case where the puncturing indication information is transmitted in slot #n−3, depending on the capabilities of the user terminal, other slots (#n−2, #n−1 and #n) can be candidates for the transmission timing of the puncturing indication information.

Furthermore, when the puncturing indication information is reported in a downlink control channel (downlink control information), it is possible to make use of downlink control information that is user terminal-specific (UE-specific), or make use of downlink control information (L1 signaling) that is common to a plurality of users (UE-common). The user-common downlink control information may be downlink control information that is common to a predetermined user group.

When the puncturing indication information is reported using L1 signaling that is common to users or common to a predetermined user group, a plurality of user terminals monitoring this L1 signaling can identify the fields to puncture.

On the other hand, when the puncturing indication information is reported using user-common L1 signaling, there may be cases where not even all the user terminals have to perform the puncturing process. Also, when the UE capability information of each user terminal (the value of m that each user terminal can use) varies, how to control the reporting of puncturing indication information is the problem. For example, when puncturing indication information is reported at the timing of m=1 to a user terminal that supports up to m=2, this user terminal will have difficulty performing the puncturing process adequately.

Therefore, while the puncturing indication information is transmitted to the user terminal in common control information, whether or not to apply this puncturing indication information (whether or not to comply with the puncturing indication) may be controlled based on other conditions.

For example, whether or not to comply with the puncturing indication information that is reported per user terminal may be configured separately, using other signaling such as higher layer signaling. That is, the user terminal, when commanded to follow the puncturing indication information via higher layer signaling, performs the puncturing process based on the puncturing indication information that is reported. Otherwise (when not commanded to comply with the puncturing indication information), even if puncturing indication information is received, the user terminal may exert control so as not to perform the puncturing process (that is, to ignore the puncturing indication information).

Also, even when the user terminal is commanded to comply with the puncturing indication information, the value of the puncturing indication information that is reported (the processing time for performing the puncturing process) may exceed the capability information of the user terminal (the time required for the puncturing process). That is, this is a case where the time from when a command is received to when puncturing is performed is shorter than the time that the user terminal can process. In this case, even if the user terminal receives the puncturing indication information, the user terminal may exert control so as not to perform the puncturing process (that is, to ignore puncturing indication information). In this case, it is not necessary to transmit different common control information depending on the processing capabilities of each user terminal, so that the overhead of control signals can be reduced.

FIG. 2 shows a case where puncturing indication information is transmitted using a TTI (for example, a slot) that is applied to UL data. For example, the present embodiment can be suitably applied to user terminals that support transmission of slot units (eMBB), but that do not support transmission of TTIs (URLLC), which are shorter units (for example, minislots).

Figure 3:
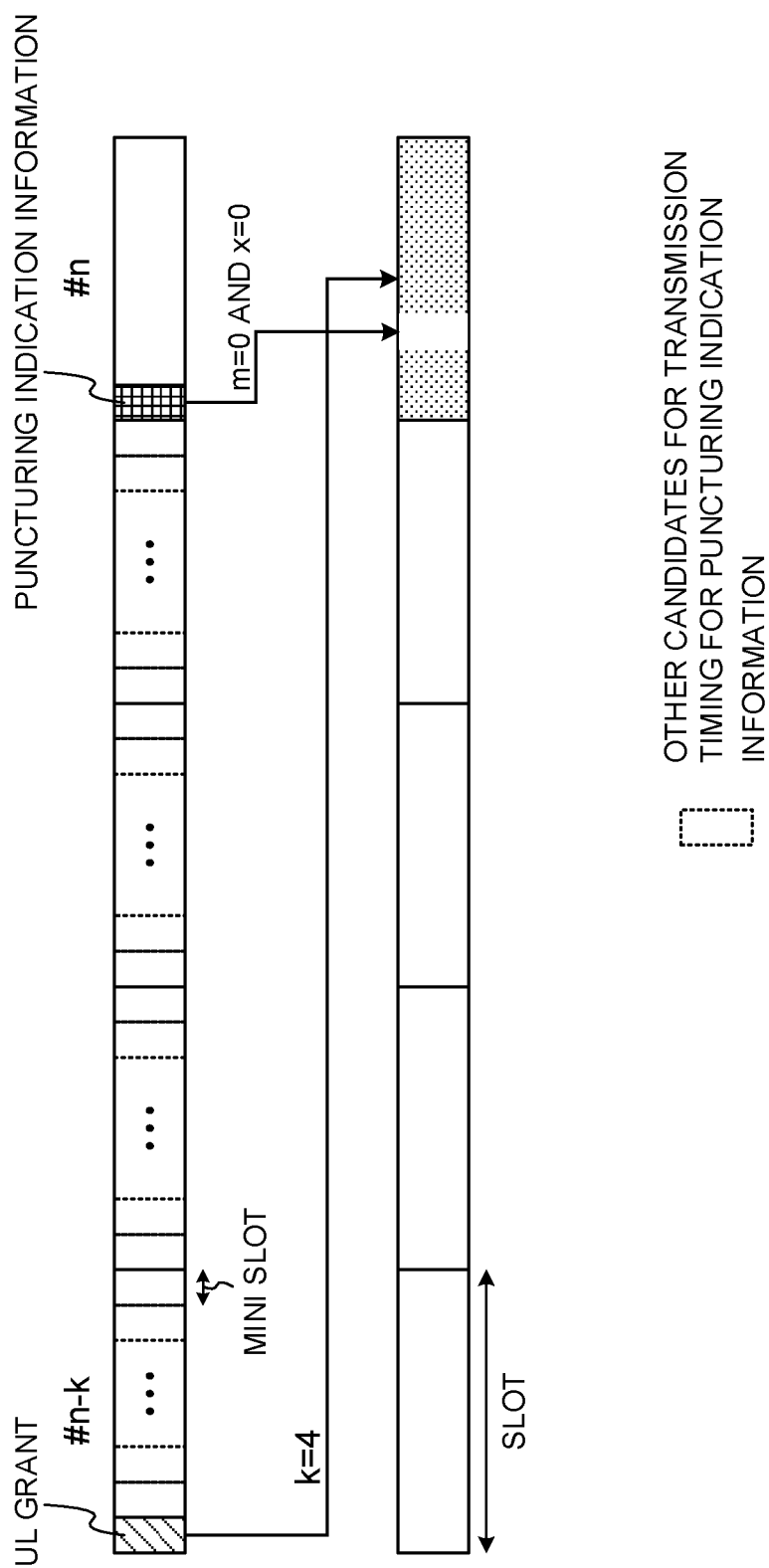
FIG. 3 is a diagram to show another example of the transmission method for use when there is interrupting data, according to the present embodiment.

Meanwhile, even when a user terminal supports UL data in slot units, if the user terminal also supports transmission of TTIs (for example, minislots), which are shorter than slots, the puncturing indication information may be reported to the user terminal by using minislots (see FIG. 3).

FIG. 3 shows a case where, based on a UL grant transmitted in a predetermined time interval (here, in slot #n−k), the user terminal transmits UL data after a predetermined time (here, in slot #n). Also, in the case illustrated here, the user terminal receives puncturing indication information at a timing a predetermined period before slot #n for transmitting the UL data (in this case, in minislot x, which is included in slot n−m). FIG. 3 shows a case where k=4, m=0 and x=0, but this is not limiting.

In this way, puncturing indication information is reported by using TTIs (here, minislots) that serve as shorter transmission units than TTIs (here, slots) that are applied to transmission of UL data (or UL grants), so that it is possible to control, flexibly, the timing for reporting puncturing indication information. Also, in this case, the user terminal may report the value of x to the radio base station, as user capability information, in addition to the value of m which the user terminal can use. The value of x may be reported as a piece of user capability information apart from the value of m, or may be included and reported in the same user capability information.

Note that, although FIGS. 2 and 3 illustrate the first UL data as being transmitted when dynamically scheduled by a UL grant, the first UL data may be transmitted in UL grant-free transmission, in which transmission is made without making reference to UL grants. In this case, resources that are available for transmission and transmission configuration information (transmission power, RS configuration, modulation scheme, TBS, etc.) are configured in the user terminal by higher layer signaling, and, if there is data to transmit, the user terminal transmits the UL data using the resources that are available for transmission, based on the configuration information.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 4:
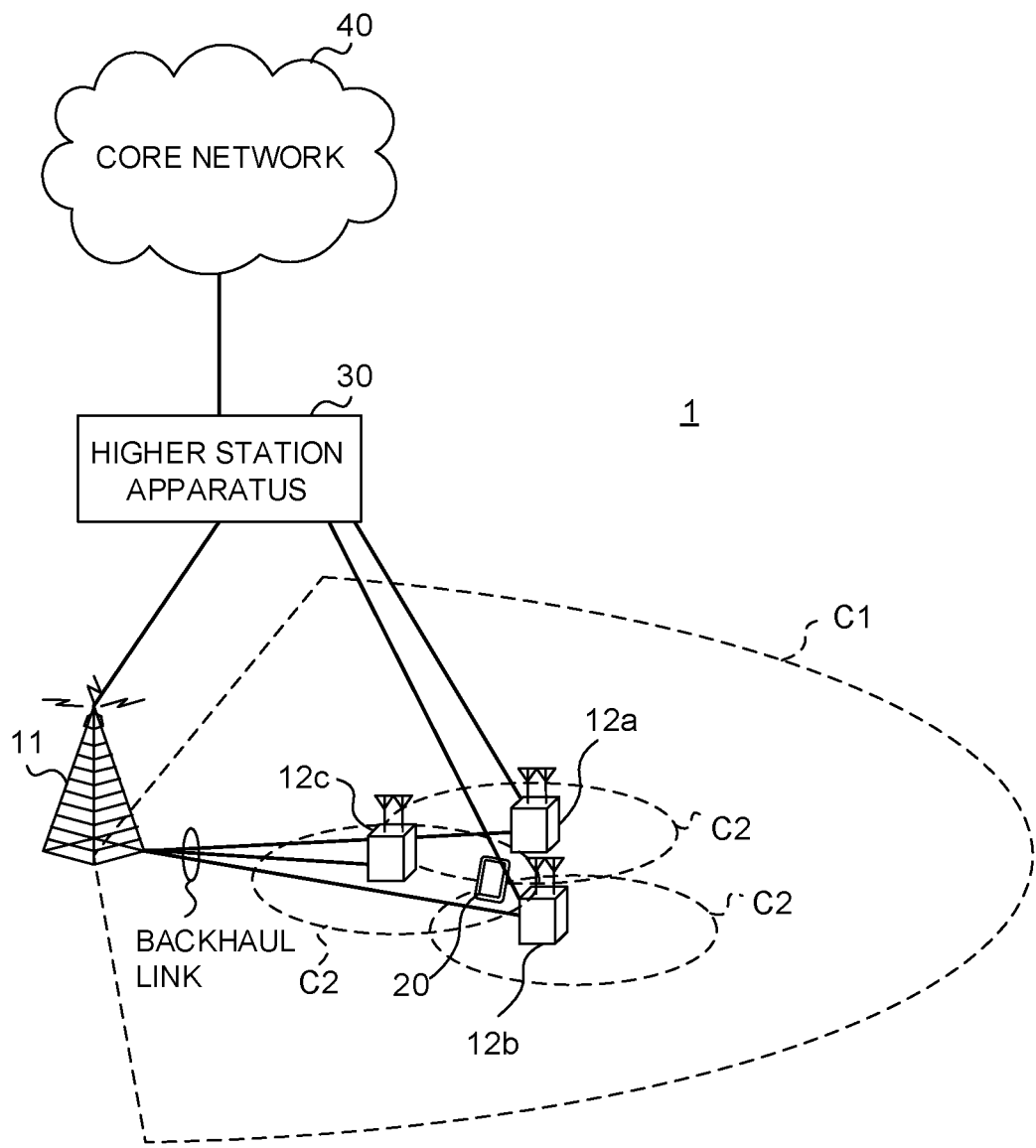
FIG. 4 is a diagram to show an example of a schematic structure of a radio communication system according to the present embodiment.

FIG. 4 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 4 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, each cell (carrier) may use either long TTIs or short TTIs, or use both long TTIs and short TTIs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ re-transmission command information (ACK/NACK) in response to the PUSCH using at least one of the PHICH, the PDCCH and the EPDCCH.

In the radio communication system 1, UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of retransmission command information (ACK/NACK), channel state information (CSI) and so on, is communicated in the PUSCH or the PUCCH. By means of the PRACH, random access preambles for establishing connections with cells are communicated.

<Radio Base Station>

Figure 5:
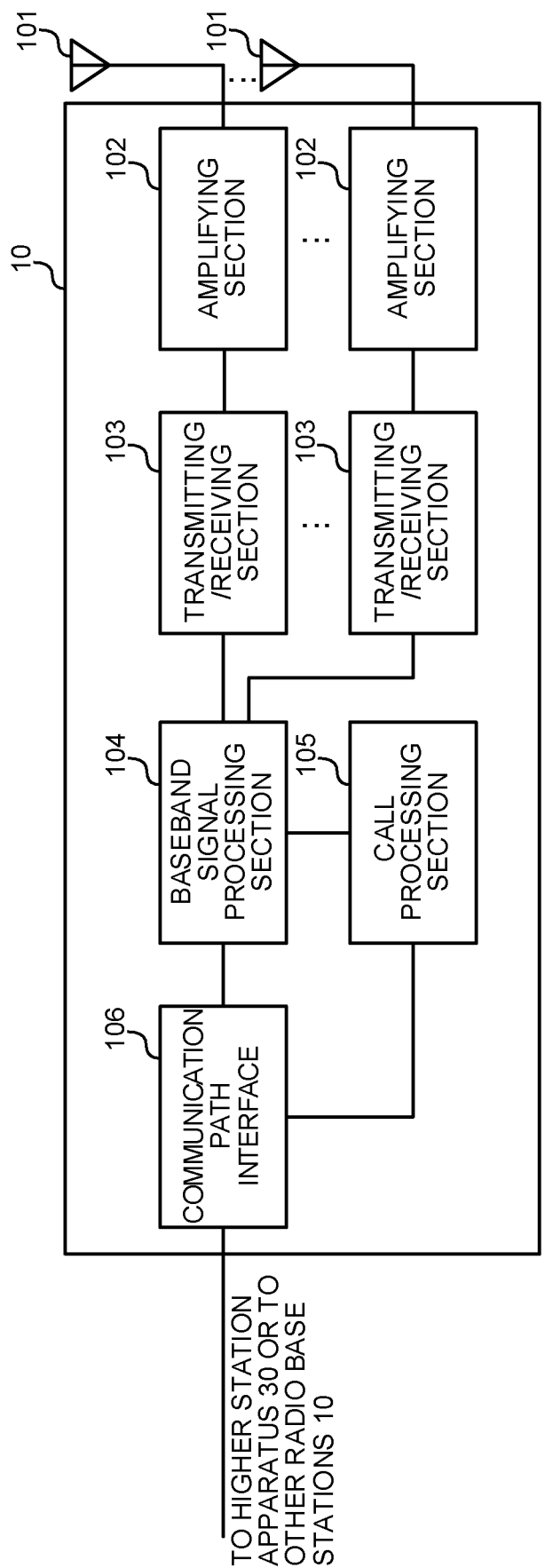
FIG. 5 is a diagram to show an example of an overall structure of a radio base station according to the present embodiment.

FIG. 5 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, in long TTIs and/or short TTIs, the transmitting/receiving sections 103 transmit DL signals (for example, scheduling information, DL data, information related to retransmission (retransmission data), etc.), and transmit UL signals (for example, UL data, feedback information, etc.). As combinations of long TTIs and short TTIs, subframes and slots, slots and minislots and/or others may be used.

In addition, the transmitting/receiving sections 103 transmit puncturing indication information after UL transmission is commanded (scheduled), by the timing a predetermined period before the timing the UL data transmission is carried out. In addition, the transmitting/receiving sections 103 receive first user capability information that relates to the timing for transmitting UL data, and second user capability information that relates to the timing for receiving information that indicates puncturing.

Also, the transmitting/receiving sections 103 may transmit the information that indicates puncturing in time units (for example, minislots) that are shorter than the time units (for example, slots) in which UL data is transmitted. In addition, the transmitting/receiving sections 103 may transmit the puncturing-indicating information in user-common control information, and transmit information concerning whether or not to follow the puncturing-indicating information, via higher layer signaling.

Figure 6:
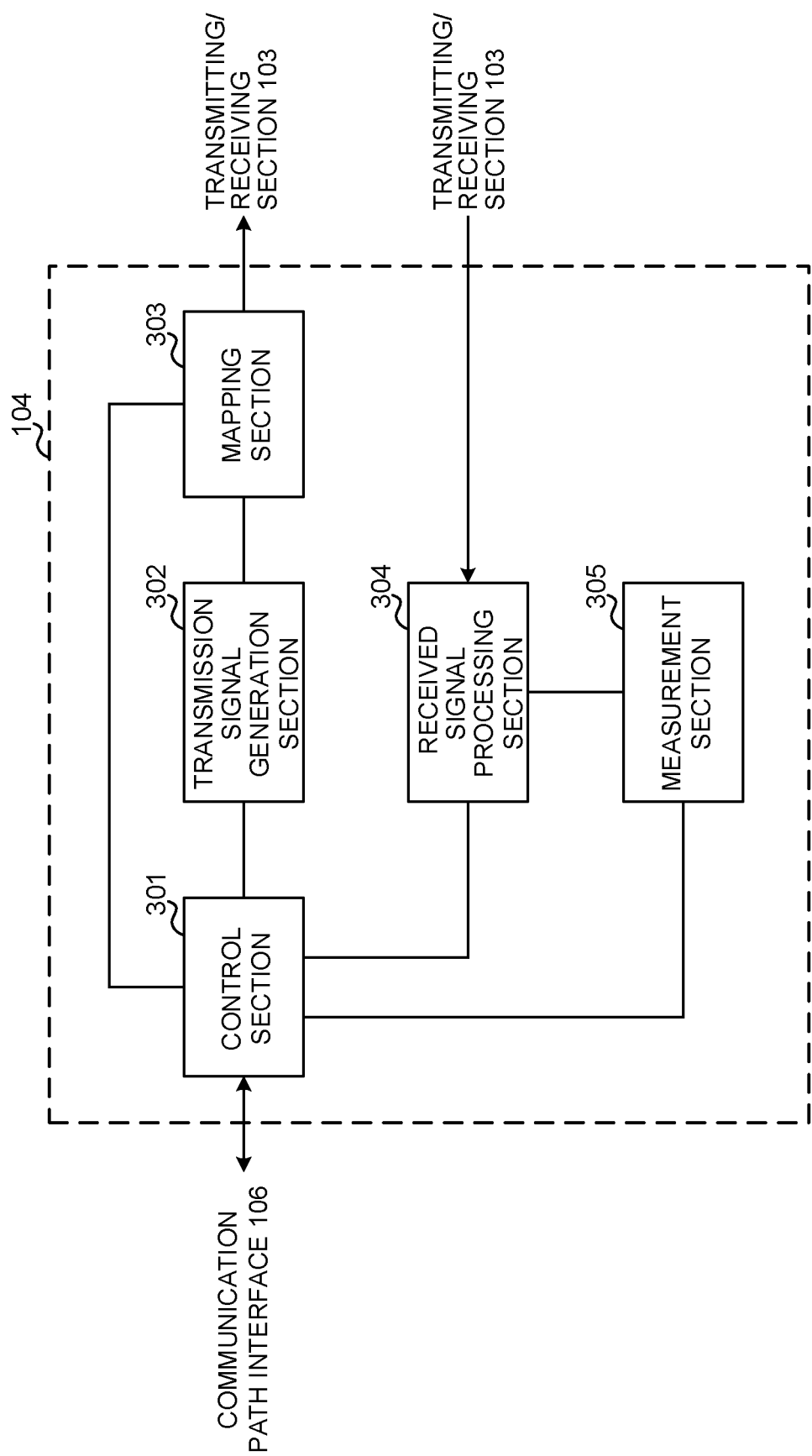
FIG. 6 is a diagram to show an example of a functional structure of a radio base station according to the present embodiment.

FIG. 6 is a diagram to show an example of a functional structure of a radio base station according to the present embodiment. Note that, although FIG. 6 primarily shows functional blocks that pertain to characteristic parts of the present embodiment, the radio base station 10 has other functional blocks that are necessary for radio communication as well. As shown in FIG. 6, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

In particular, the control section 301 schedules long TTIs and/or short TTIs. The control section 301 may control the transmission process (for example, encoding, modulation, transmission, etc.) of scheduling information using a scheduling control channel in long TTIs and/or short TTIs. Alternatively, the control section 301 may control scheduling where shortened processing time is applied.

In addition, the control section 301 transmits UL grants and controls the transmission of UL data in the user terminal. The time from a UL grant to UL data transmission may be controlled based on capability information (for example, the value of k) that is reported from the user terminal. In addition, the control section 301 controls interrupting data transmission, and transmits puncturing indication information when interrupting transmission occurs. The timing for transmitting the puncturing indication information may be determined based on capability information (for example, the value of m) that is reported from the user terminal, the timing the interrupting data is generated, and so on.

The control section 301 can be constituted by a controller, a control circuit or control apparatus that can be described based on general understanding of the technical field to which the present invention pertains.

The transmission signal generation section 302 generates DL signals (including DL data, scheduling information, reference signals, etc.) based on commands from the control section 301, and outputs these to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs the receiving process (for example, demapping, demodulation, decoding and so on) of uplink signals that are transmitted from the user terminals 20. To be more specific, the received signal processing section 304 may output the received signals, the signals after the receiving process and so on, to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 7:
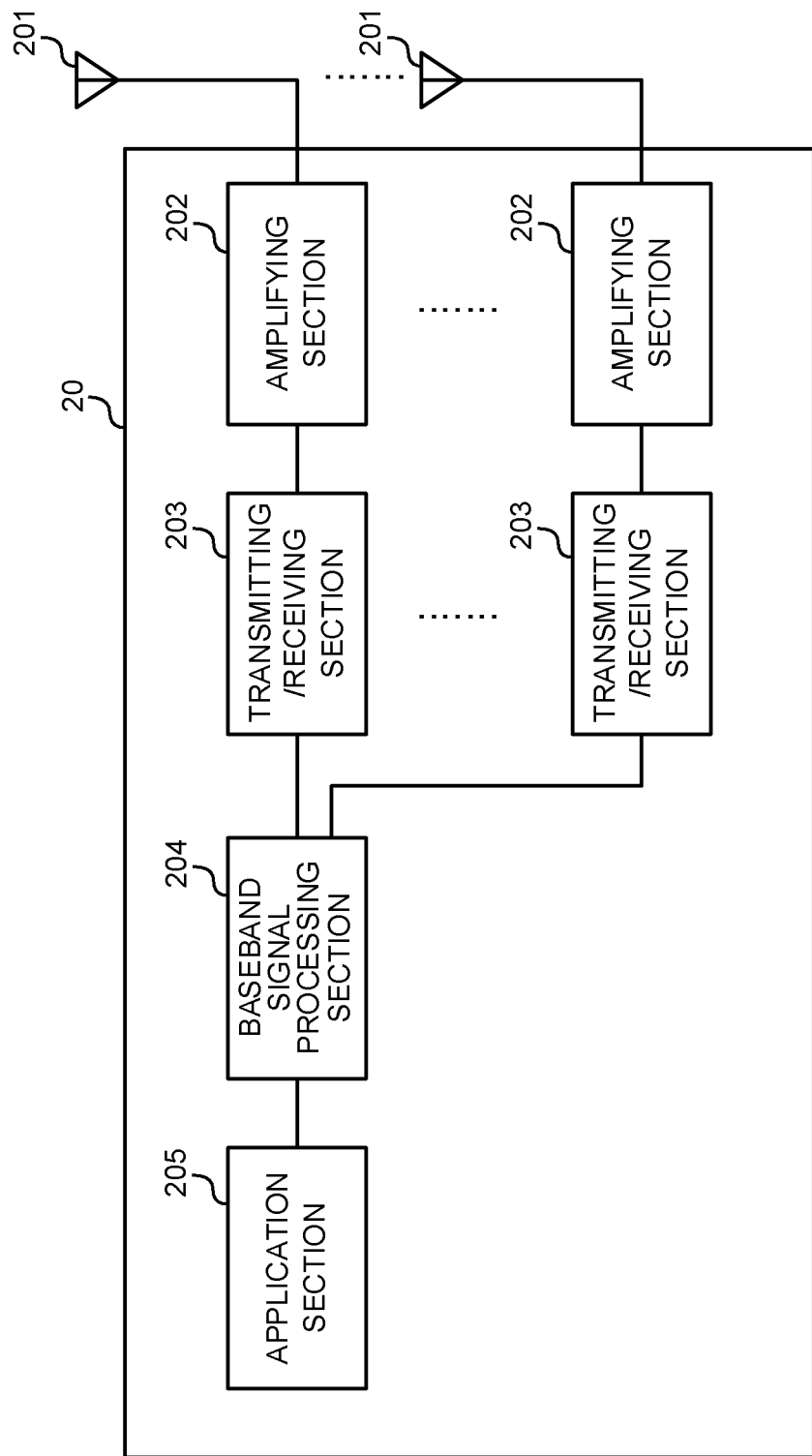
FIG. 7 is a diagram to show an example of an overall structure of a user terminal according to the present embodiment.

FIG. 7 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Furthermore, in the downlink data, broadcast information is also forwarded to the application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, and so on) is also subjected to channel coding, rate matching, puncturing, DFT process, IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, in long TTIs and/or short TTIs, the transmitting/receiving sections 203 transmit DL signals (for example, scheduling information, DL data, information related to retransmission (retransmission data), etc.), and transmit UL signals (for example, UL data, feedback information, etc.). As combinations of long TTIs and short TTIs, subframes and slots, slots and minislots and/or others may be used.

In addition, the transmitting/receiving sections 203 receive puncturing indication information after UL transmission is commanded (after a UL grant is received), by the timing a predetermined period before the timing the UL data transmission is carried out or the puncturing process is performed (see FIGS. 2 and 3). In addition, the transmitting/receiving sections 203 transmit first user capability information that relates to the timing for transmitting UL data (for example, a value of k which the user terminal 20 can support), and second user capability information that relates to the timing for receiving information that indicates puncturing (for example, a value of m which the user terminal 20 can support).

Also, the transmitting/receiving sections 203 may receive the information that indicates puncturing in time units (for example, minislots) that are shorter than the time units (for example, slots) in which UL data is transmitted. In addition, the transmitting/receiving sections 103 may receive the puncturing-indicating information in user-common control information, and receive information concerning whether or not to follow the puncturing-indicating information, via higher layer signaling.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 8:
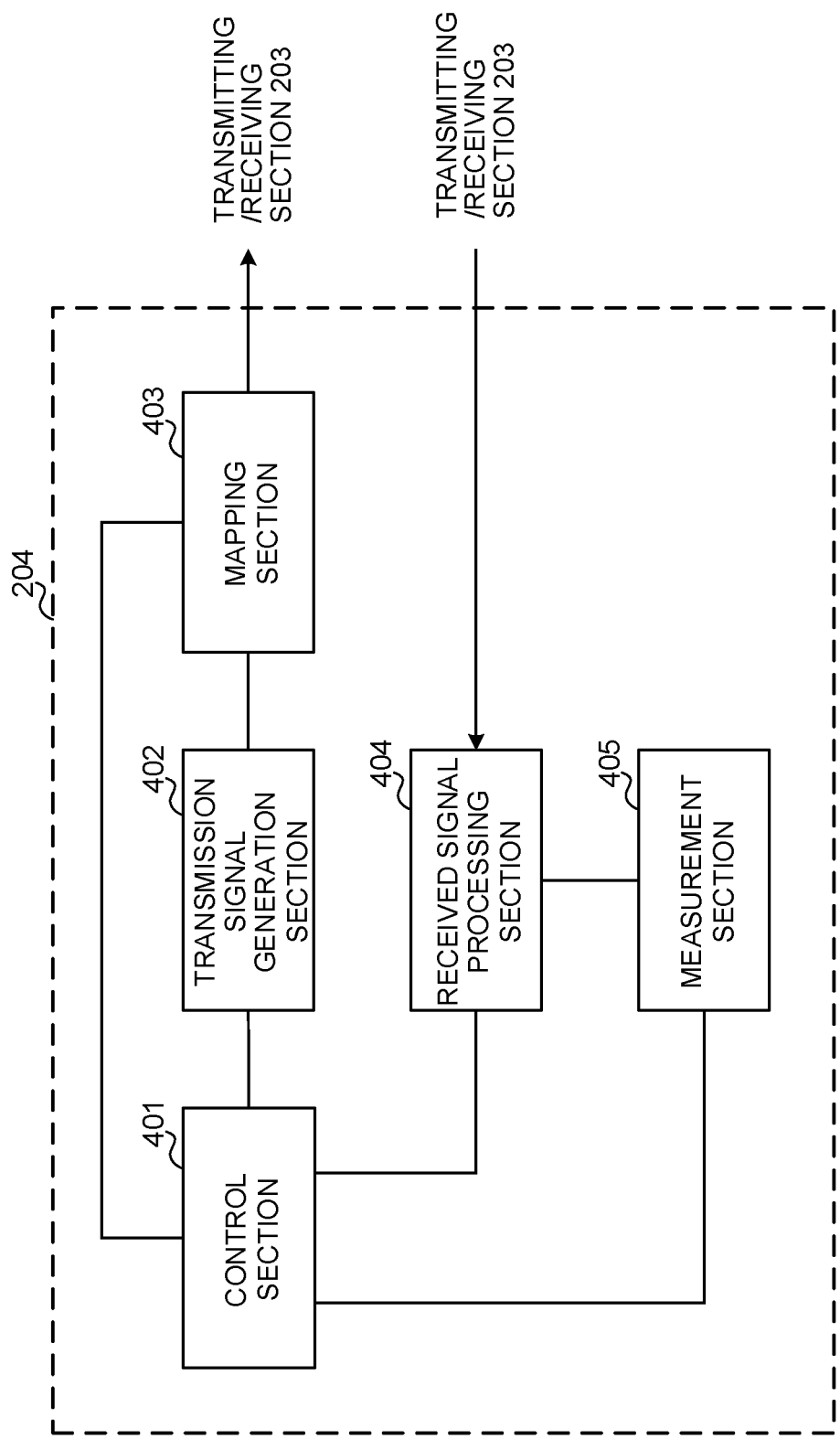
FIG. 8 is a diagram to show an example of a functional structure of a user terminal according to the present embodiment.

FIG. 8 is a diagram to show an example of a functional structure of a user terminal according to the present embodiment. Note that, although FIG. 8 primarily shows functional blocks that pertain to characteristic parts of the present embodiment, the user terminal 20 has other functional blocks that are necessary for radio communication as well. As shown in FIG. 8, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in the received signal processing section 404, the measurements in the measurement section 405 and so on.

To be more specific, the control section 401 may monitor (blind-decode) DL control channels in long TTIs and/or short TTIs, and detect long TTI and/or short TTI scheduling information pertaining to the user terminal 20.

In addition, the control section 401 controls the receipt of DL signals and/or the transmission of UL signals in long TTIs and/or short TTIs. To be more specific, the control section 401 may control the DL data receiving process (for example, receipt, demapping, demodulation, decoding, etc.) and/or the UL data transmission process (for example, encoding, modulation, mapping, transmission, etc.) in long TTIs and/or short TTIs.

In addition, the control section 401 exerts control so that, when a UL transmission command is received, UL data is transmitted a predetermined timing later, and, when information that indicates puncturing of at least part of UL data is received, applies puncturing to the UL data. In addition, the control section 401 exerts control so that first user capability information, which relates to the timing for transmitting UL data, and, second user capability information, which relates to the timing for receiving information that indicates puncturing, are transmitted. In addition, the control section 401 exerts control so that the puncturing-indicating information is received in time units that are shorter than the time units in which UL data is transmitted.

For the control section 401, a controller, a control circuit or control apparatus that can be described based on general understanding of the technical field to which the present invention pertains can be used.

The transmission signal generation section 402 generates UL signals (including, for example, encoding, rate matching, puncturing, modulation, etc.) based on commands from the control section 401, and outputs these signals to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs the receiving process (for example, demapping, demodulation, decoding, etc.) of DL signals (DL data, scheduling information, etc.). The received signal processing section 404 outputs the information received from the radio base station 10, to the control section 401. The received signal processing section 404 outputs, for example, broadcast information, system information, high layer control information that is provided via higher layer signaling such as RRC signaling, L1/L2 control information (for example, scheduling information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC. Measurement section 405 may also perform channel estimation using the first and second reference signals and output the estimated results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 9:
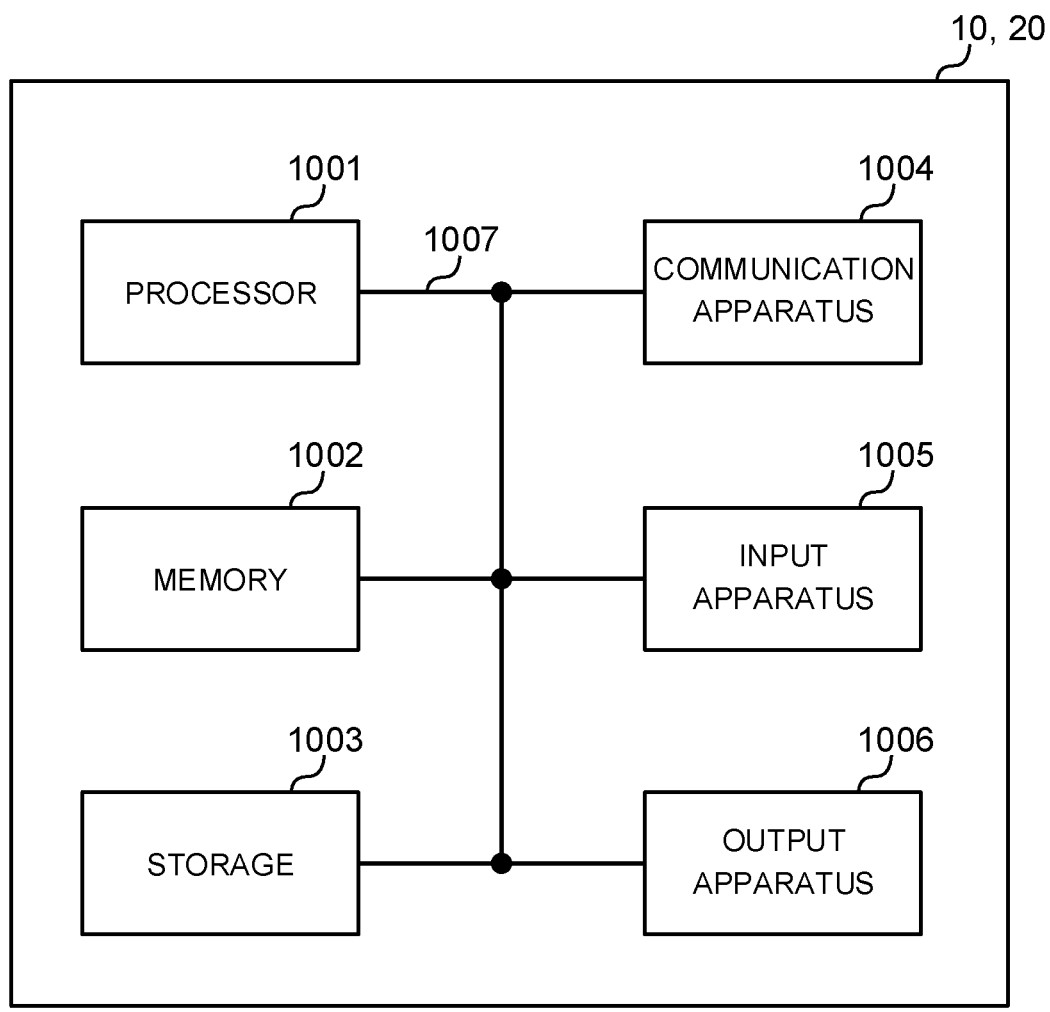
FIG. 9 is a diagram to show an example hardware structure of a radio base station and a user terminal according to the present embodiment.

That is, a radio base station, a user terminal and so on according to one embodiment of the present invention may function as a computer that executes the processes of the radio communication method of the present invention. FIG. 9 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI,"

a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-included description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a first downlink control information for scheduling a physical uplink shared channel (PUSCH) transmission, and a second downlink control information for notifying a time region and a frequency region in which the PUSCH is not to be transmitted; and a processor that supports reception of the second downlink control information in a slot that is shorter than a slot for transmitting the PUSCH.

2. The terminal according to claim 1, wherein the receiver receives the second downlink control information in the slot that is shorter than the slot for transmitting the PUSCH.

3. The terminal according to claim 1, wherein the processor determines whether or not to transmit the PUSCH according to the second downlink control information based on a higher layer signaling.

4. The terminal according to claim 1, wherein the processor controls transmission of capability information related to a determination of a number of symbols from a symbol receiving the second downlink control information to a symbol not transmitting the PUSCH according to the second downlink control information.

5. A radio communication method for a terminal, comprising:
receiving a first downlink control information for scheduling a physical uplink shared channel (PUSCH) transmission; and
receiving a second downlink control information for notifying the time region and frequency region in which the PUSCH is not to be transmitted, wherein the second downlink control information is supported for reception in a slot that is shorter than a slot for transmitting the PUSCH.

6. A base station comprising:
a transmitter that transmits a second downlink control information that notifies a time region and frequency region in which a physical uplink shared channel (PUSCH) scheduled by a first downlink control information is not to be transmitted; and
a processor that supports transmission of the second downlink control information in a slot that is shorter than a slot for transmitting the PUSCH.

7. The terminal according to claim 2, wherein the processor determines whether or not to transmit the PUSCH according to the second downlink control information based on a higher layer signaling.

8. The user terminal according to claim 2, wherein the processor controls transmission of capability information related to a determination of a number of symbols from a symbol receiving the second downlink control information to a symbol not transmitting the PUSCH according to the second downlink control information.

9. The user terminal according to claim 3, wherein the processor controls transmission of capability information related to a determination of a number of symbols from a symbol receiving the second downlink control information to a symbol not transmitting the PUSCH according to the second downlink control information.

* * * * *